G. H. KING & G. I. ROBERTS.
PROCESS OF MAKING ALUMINUM CHLORID.
APPLICATION FILED JUNE 15, 1917.

1,268,015.

Patented May 28, 1918.
2 SHEETS—SHEET 1.

Inventors
George H King
and
Gerald I Roberts.
By
K. P. McElroy
Attorney

G. H. KING & G. I. ROBERTS.
PROCESS OF MAKING ALUMINUM CHLORID.
APPLICATION FILED JUNE 15, 1917.
1,268,015.
Patented May 28, 1918.
2 SHEETS—SHEET 2.
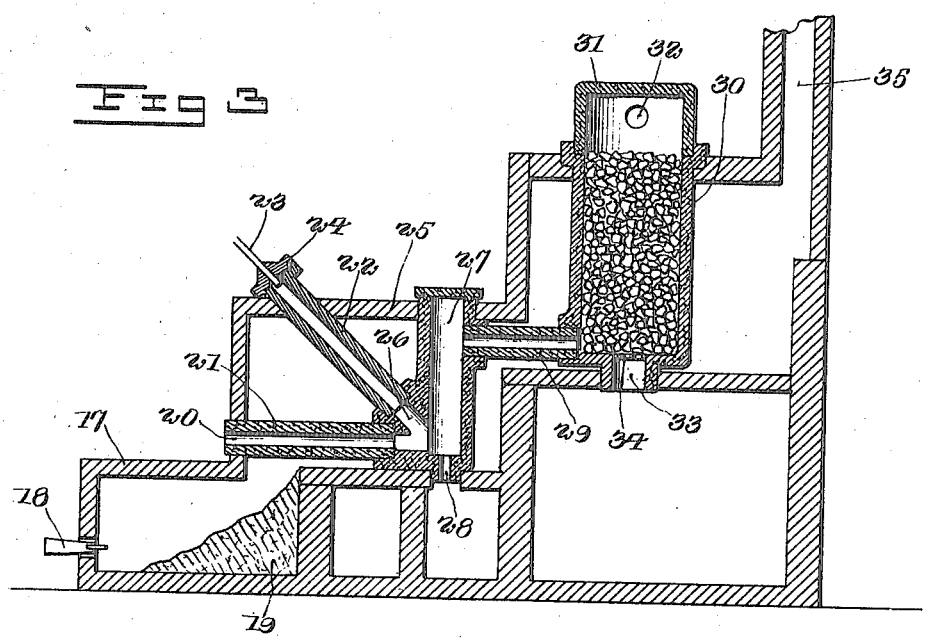
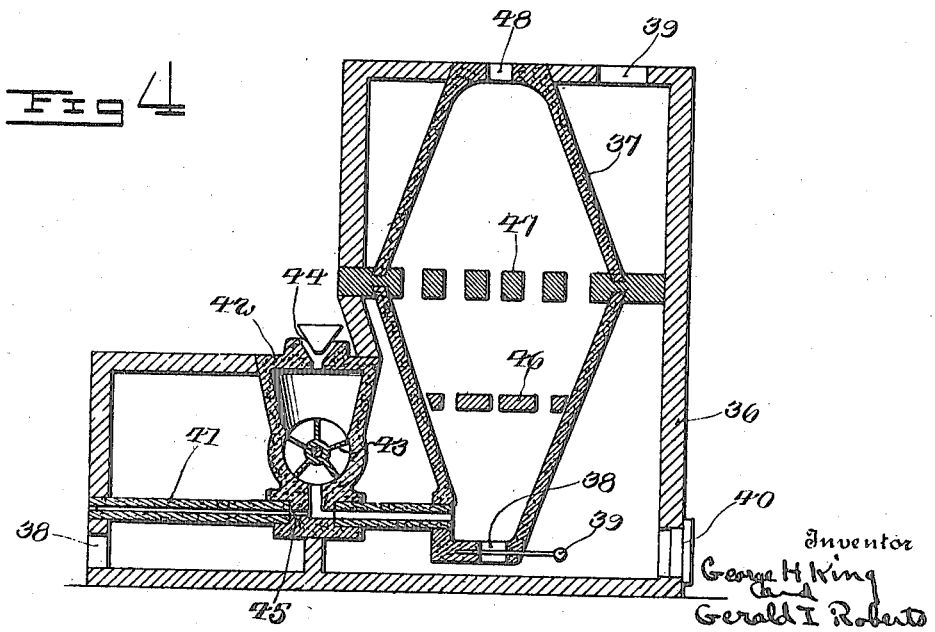

UNITED STATES PATENT OFFICE.

GEORGE H. KING AND GERALD I. ROBERTS, OF PORT ARTHUR, TEXAS, ASSIGNORS TO GULF REFINING COMPANY, OF PITTSBURGH, PENNSYLVANIA, A CORPORATION OF TEXAS.

PROCESS OF MAKING ALUMINUM CHLORID.

1,268,015.   Specification of Letters Patent.   Patented May 28, 1918.

Application filed June 15, 1917. Serial No. 175,006.

*To all whom it may concern:*

Be it known that we, GEORGE H. KING, and GERALD I. ROBERTS, citizens of the United States, residing at Port Arthur, in the county of Jefferson and State of Texas, have invented certain new and useful Improvements in Processes of Making Aluminum Chlorid, of which the following is a specification.

This invention relates to processes of making aluminum chlorid; and it comprises a method of producing aluminum chlorid by the reaction of chlorin upon mixtures of alumina and carbon or upon certain solid residues of oil refining wherein reaction is performed in transit and wherein the necessary heat for the reaction is afforded by preheating the solid materials; all as more fully hereinafter set forth and as claimed.

Aluminum chlorid is a reagent or chemical of great utility in various arts, notably treatment of petroleum for various purposes; but it is unduly expensive. While it can be made from alumina (bauxite) carbon and chlorin by the reaction

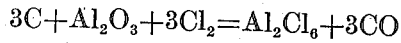

$$3C + Al_2O_3 + 3Cl_2 = Al_2Cl_6 + 3CO$$

and therefore should be a relatively cheap material, yet in practice it is difficult so to produce it and resort is frequently made to production from metallic aluminum in spite of the high cost of the latter. The difficulties are, so to speak, mechanical. The reaction is an endothermic one, that is, it requires a supply of heat and it takes place only at a rather high temperature, namely around a red heat. The amount of heat which must be supplied is not great but there must be a supply of some. Ordinarily when aluminum chlorid is made from alumina, the reaction is performed in a retort within which are contained the alumina and carbon and through which the chlorin is passed, vapors of aluminum chlorid coming from the retort being suitably condensed. In order to give as high a surface area to the solid materials for reaction as possible as a rule the alumina and the carbon are fine ground and then briqueted or otherwise agglomerated. But it is in practice very difficult to transmit heat through a retort wall to any open textured mass of material not freely conductive of heat; as is the case with a mixture of alumina and carbon. In order to obtain a sufficient temperature in the interior of the mass it is necessary to superheat the walls. But there are very few materials which at a red heat will withstand separate and conjoint action of chlorin and carbon. The aluminum chlorid also is a highly reactive material. The retorts, which are generally made of clay, in practice prove short-lived. The larger the retorts, the greater of course are the heating difficulties. And with large retorts comes another difficulty that of securing effective contact of the draft current of chlorin with all parts of the pervious mass. Channeling is apt to occur.

In the present invention we obviate these difficulties which are, as stated, of a nature which may be called mechanical by the simple expedient of preheating a granular or fine ground mixture of carbon and alumina to the necessary temperature and thereafter contacting the so heated materials with chlorin in transit. There is little or no difficulty in superheating these materials to any desired temperature prior to contact with chlorin. In so doing and in contacting the preheated materials with a current of chlorin both the chlorin and the solid material being moving, there is no difficulty in obtaining as large and effective area of contact as necessary. With the solid particles and the chlorin gas both moving, admixture and thorough contact are positive; there can be no question of channeling; that is of a preferential passage of the gas through one portion or other of a body of the solid material. And it is easy to secure a thorough utilization of the chlorin; something which is difficult in other methods. In any method in the first stages of the action when the gas or atmosphere bathing the solid material is chlorin in a pure state or state of high concentration, the velocity of the action is great; but as the chlorin is diluted and replaced by aluminum chlorid vapors, action slackens; so that frequently the vapors removed from the zone of reaction still contain considerable free chlorin. This is undesirable, not only because of the waste of chlorin but because its presence makes such vapors hard to handle. In the present method where predetermined proportions of fine or pulverulent alumina-carbon mixture and chlorin are fed together this difficulty takes care of itself, since as the particles waste away they become finer and more dustlike; they are easier to suspend in the current of gas and vapors. When the bulk of the solid has disappeared and the reaction mixture becomes a dust-laden current of vapors, further heating, if necessary becomes a simple matter since it is not a question of conveying heat through a granular mass or of exposing hot retorts to gases rich in chlorin.

Many embodiments of this invention embodying the stated principles are possible.

In all the preheating of the alumina-carbon mixture is best done in a retort or the like. Chlorin being absent this offers no difficulty. Iron or ceramic materials may be used. Heating should be out of contact with air or fire gases, both of which remove carbon and disturb the composition of the mixture. Any foreign gases present in the mixture further act as diluents of the chlorin and slow up its action. The preheated mixture may be advantageously fed into a current of chlorin and thereby conveyed into a heated retort or chamber. The chlorin necessary in the reaction being very many times the volume of the solid matter, a conveyance in dust form by the chlorin is easy.

This embodiment of the present invention allows its use on existing installations provided with retorts and condensing chambers as usual. With such an installation instead of filling the retort with briqueted or granulated reaction mixture and then supplying chlorin after the mass becomes heated up, we first heat up the empty retort and then blow in pulverulent preheated reaction mixture with the current of chlorin, using any convenient device of the general type of those employed in burning powdered coal for cement kilns and the like. The "burner" however is best made of clay instead of iron, partly because of the heat of the preheated solid material and partly because of the corrosive action of chlorin. Because of this corrosive action and of the difficulty of handling hot chlorin under any pressure, we do not ordinarily preheat the chlorin. Nor in this embodiment of the present invention do we need to preheat the alumina-carbon mixture so as to carry with it all the heat units necessary. The hot retort furnishes much of the required heat. The "burner" is supplied with fine-ground reaction mixture through what would be the coal inlet in a cement kiln burner and with dry chlorin through the air inlet. The "burner" may be mounted directly on the end of the retort, or may communicate therewith through a fire-clay conduit. The latter allows a further preheating of the mixture prior to entry into the retort and adds considerably to the output per hour.

If the mixture used is free of silica and ash, there is no accumulation of waste material in the retort; if it be not, the retort must be cleaned from time to time to remove accumulations. For this reason, the use of carbon in the form of petroleum coke of reasonably pure alumina is better. But ordinary coke and ordinary bauxite may be employed. Bauxite may be dehydrated, fine ground and mixed with fine-ground coke in the correct proportion. Alumina requires, theoretically a little over a third of its weight of carbon for reaction (103:36). Or ground bauxite may be mixed with fine ground coking coal, the mixture coked as granules or briquets, and then reground. Whatever the mixture it is best to grind it so as to pass a sieve of tolerably fine mesh, say 40 mesh. The finer it is, the better it is adapted for suspension in the gas and vapor current and the more nearly the principles of the present invention are available.

Instead of using bauxite (or other form of alumina) and carbon it is possible to use a number of coky residues formed in oil refineries as a result of the reaction of aluminum chlorid upon oils. Aluminum chlorid has a catalytic effect on oils but after a period of use it separates as a tarry, pitchy or coky mass which no longer has catalytic power in a useful degree. These residues are often rather oily in their character. They contain aluminum and chlorin, which may be present in the form of aluminum chlorid combined with hydrocarbons or with carbon, at least in part; or may exist in the form of alumina and various chlorin compounds. Whatever the nature of the aluminum compounds in these residues, they give aluminum chlorid on treatment with chlorin; and for the present purposes, whatever mixtures of alumina and carbon or reaction mixtures are mentioned, the term may be regarded as applying to these residues. It is not, for the present purposes, material whether this production be the release of preëxisting aluminum chlorin or a new formation thereof. The residues may or may not contain aluminum and chlorin in the right ratio for the formation of aluminum chrolid. In the former event, addition of more chlorin necessitates the addition of a counterbalancing amount of alumina; in the latter event, which ordinarily occurs by loss of HCl through the action of moisture, addition of more alumina may not be necessary. In admixture with the residues alumina (bauxite) reacts more readily with chlorin than it does alone; a fact which renders it desirable to admix, wherever possible, more or less of such a residue with bauxite in making aluminum chlorin. Treatment of these residues is best rather special. The hot coky or pitchy mass removed from the still is advantageously fine ground in the presence of gasolene or kerosene. This has the purpose of shielding the material from the action of air. Moisture quickly acts on these residues, generating hydrochloric acid and forming alumina or hydrated aluminum chlorid as the case may be. Grinding may be in a closed ball mill and such bauxite and carbon as may be added are admixed prior to grinding. By fine grinding together the mixture becomes very intimate. Since the bauxite absorbs part of the oil from the coke, the mixture is less apt to cake in handling. The mixture, furthermore does not take up moisture as readily as is the case with the coky residues alone and the chlorin (or aluminum chlorid) is retained in a more available form. After grinding the mixture is allowed to settle and the gasolene removed by decantation, the use of a centrifugal or by a press, as may be considered most convenient. The mixture is then gently heated to remove residual gasolene or kerosene. Sometime with particularly oily residues, a second washing with gasolene may be advisable. The dry, fine ground material may then be used as described for the coke-bauxite mixture; being used either alone or in admixture with more coke and bauxite.

It is of course within the purview of this invention to use any other solid material capable of reaction with chlorin to form aluminum chlorid, such as aluminum carbid (or electric furnace products containing the same), aluminum sulfid, etc.

The chlorin may be taken directly from electrolytic cells producing the same, dried, and used at once; or it may be derived from any other suitable source. It is best used as concentrated and dry as possible. Weak chlorins, such as those furnished by the Deacon process and some others, introduce too much diluting gases to permit rapid reaction.

In the accompanying illustrations are shown more or less diagrammatically certain apparatus in which the process may be performed. In this showing, Figure 1 is a central vertical section of one form of apparatus in which the retort is horizontally disposed;

Figs. 3 and 4 are longitudinal vertical sections of different forms of apparatus for carrying out the process under somewhat different conditions than that of Figs. 1 and 2.

Figure 1:
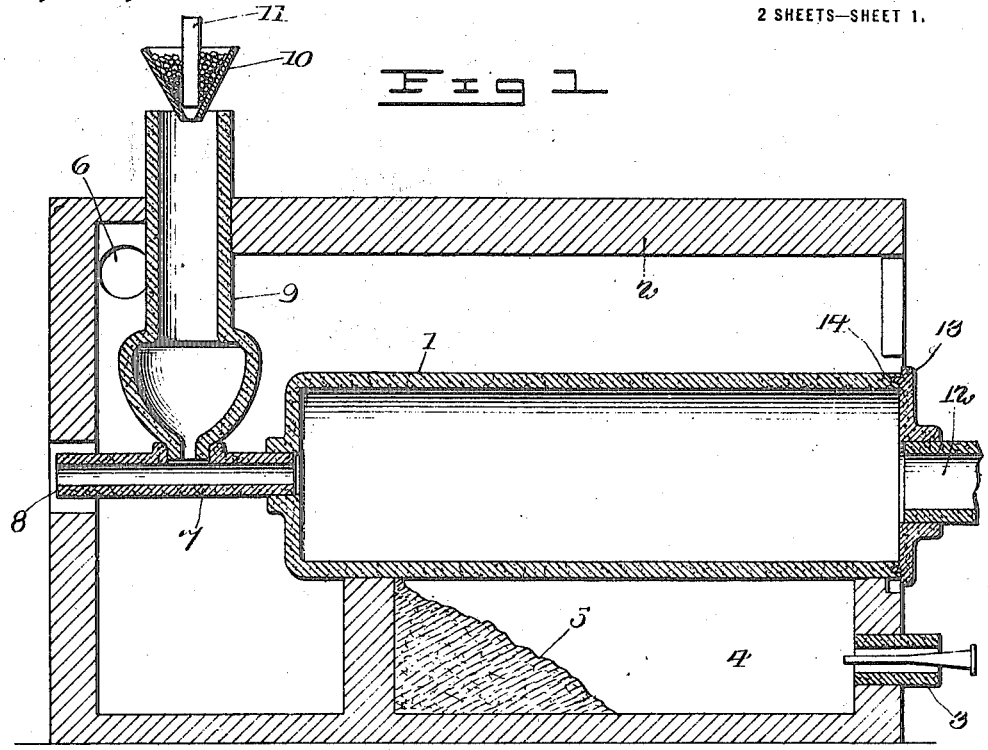

In the showing of Fig. 1, 1 indicates a horizontal retort of any convenient material such a fireclay or the like supported in chamber 2, which is fired or heated by means of oil burner 3 or any other convenient means. The gases entering the fire box 4 pass around the retort, being properly deflected after striking against the brickwork baffle 5, heat this retort and pass to the stack flue 6. Entering one end of the retort 1 is a fireclay conduit 7 into which the chlorin is fed at 8. Communicating with this conduit or "burner" is a vertical solid material feeding chamber 9 which extends upwardly in the heated portion of the chamber 2. At its top it is provided with feeding hopper 10 and with control means 11 for admitting the mixture of reaction material such as carbon and alumina. The chlorin entering at 8 under such pressure or with such force as may be necessary picks up and carries forward the pulverulent reaction mixture dropping through the chamber 9. This material has been preheated before coming into contact with the chlorin, and the chlorin is heated to some extent. The chlorin together with the reaction material enter into the retort 1 where aluminum chlorid is formed. The aluminum chlorid vapors pass from the retort 1 through outlet 12 to any suitable collection apparatus adapted for the condensation of the aluminum chlorid vapors.

When it is necessary to clean the interior of the retort, this may be done by removing the end 13, such end being dovetailed at 14 to the retort.

Figure 2:
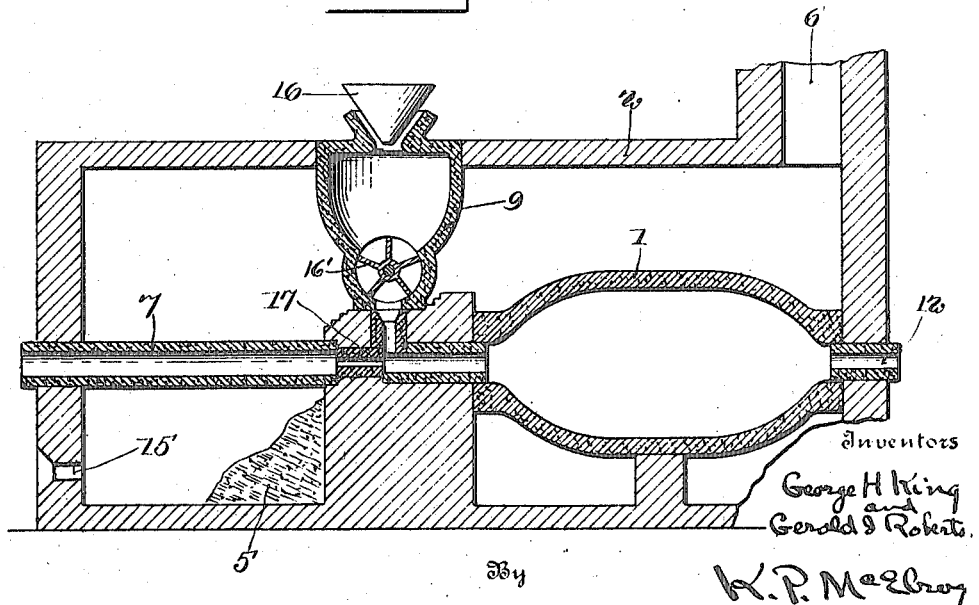
Fig. 2 is a similar view of a slightly different form.

The apparatus of Fig. 2 is somewhat different from that of Fig. 1. The horizontal retort is indicated by 1 and the fire chamber by 2. The heating gases from a source (not shown) enter through 15 and serve to heat the chlorin feeding conduit or burner 7 and to heat the material chamber 9. This material chamber is provided with a hopper 16 and is preferably filled with the mixture of carbon and alumina. Instead of the mixture passing through the chamber 9 in a powdered form, it is "stored", so to speak, in this chamber and is fed from the bottom of it into the current of chlorin which emerges from the tube or conduit 7 at 17. Valve or feeding device 16' at the bottom of this chamber serves to feed the mixture into the current of chlorin. This chlorin carries forward the reaction mixture to the retort 1 from which the aluminum chlorid vapors escape at 12 to a suitable condenser. In Fig. 2 the heated gases first contact with the chlorin tube, then with the chamber containing the reaction material and then with the retort 1, whereas in Fig. 1 the gases first contact with the retort and then with the reaction chamber 9 and the conduit or burner 7. In Fig. 1 the reaction material is advantageously fed as a continuous stream down through chamber 9 into the conduit 7, whereas in Fig. 2 the material is preferably temporarily stored in chamber 9 although the feed into this chamber may be continuous. This feed is controlled by means of the valve 16.

The apparatus shown in Fig. 3 is particularly advantageous for carrying out this process. The firing chamber 17 is provided with a burner 18 and with a brickwork baffle 19 to deflect the flames in the proper direction. The chlorin is admitted at 20 into the burner or conduit 21 while the reaction material is continuously fed downwardly through the conduit 22, the feed being controlled by means of the feeding device 23 passing through the cap 24 of this conduit. The chlorin tube or burner 21 and the reaction material conduit 22 are located in an upper fire chamber 25, which chamber is heated by the gases from the fire chamber 17. The chlorin and the reaction material meet at the ends of their respective conduits as indicated at 26 and pass into the retort 27, which is also heated by the gases from the burner 18. The retort or reaction chamber is provided with the outlet 28 for cleaning purposes. From this reaction chamber 27 conduit 29 leads to the coke tower 30, conducting the aluminum chlorid vapors which have been formed past the coke 31 contained in such tower to the outlet 32 from whence the vapors are conducted to a suitable condenser (not shown). The coke tower is provided with an opening 33 closed by a grate or the like 34 which may be removed in order that the coke tower may be cleaned. The waste gases after having contacted with the chlorin tube or burner, the aluminum chlorid and carbon feeding conduit, the retort or reaction chamber and the coke tower, pass to the stack 35. This form of apparatus is particularly convenient in carrying out the process in that it provides for the thorough preheating of the chlorin and raction material.

In Fig. 4, 36 indicates the heated chamber in which the sectional retort 37 is supported. The heating gases from a source not shown enter through 38 and pass to a stack at 39. Door 40 may be provided for removing ash and waste which are taken from the retort 37. The chlorin conduit 41 is located at the front of the apparatus where it is first contacted by the heating gases. The reaction material chamber 42 may be of the type shown in Fig. 2 wherein the mixture of carbon and alumina is temporarily stored and preheated by the gases. The material is fed from this chamber by feeding device 43 and continuously or intermittently fed into the chamber through inlet 44. The chlorin emerging from the tube or conduit 41 at 45 picks up and carries forward the pulverulent reaction material and delivers it into the retort 37 near the bottom thereof. This retort is provided with a series of baffles 46 and 47 to permit thorough mixture of the dust and the chlorin. The aluminum chlorid formed is delivered through outlet 48 to a condenser not shown.

Ash and waste may be removed from the bottom of retort 37 through the hole 38 provided with the door 39. In this form of apparatus the chlorin is preheated in the conduit or tube 41 and the reaction material is preheated, advantageously in bulk, in the reaction material chamber 43, and the retort 37 is located directly in the fire chamber 36 and is entirely surrounded by the gases before they escape to the stack 39.

The operation of the different forms of apparatus is obvious from the foregoing.

What is claimed is:—

1. The process of forming aluminum chlorid from solid reaction mixtures and chlorin which comprises passing the required proportions of chlorin with such reaction mixture in a dustlike form through a heated conduit.

2. The process of forming aluminum chlorid from solid reaction mixtures and chlorin which comprises passing the required proportions of chlorin with highly preheated reaction mixture in a dustlike form through a heated conduit.

3. The process of forming aluminum chlorid from solid reaction mixtures and chlorin which comprises contacting the chlorin with the powdered reaction mixture and passing the two together through a heated chamber and collecting the aluminum chlorid vapors produced.

4. The process of forming aluminum chlorid from solid reaction mixtures and chlorin which comprises contacting the chlorin with the powdered reaction mixture and passing the two together through a heated chamber, then passing these vapors in contact with refractory material and collecting and condensing the aluminum chlorid vapors produced.

5. The process of forming aluminum chlorid from solid reaction mixture and chlorin which comprises contacting preheated finely powdered alumina and carbon with chlorin, passing the mixture through a heated reaction chamber and condensing the aluminum chlorid vapors formed.

6. The process of forming aluminum chlorid from solid reaction mixtures and chlorin which comprises feeding preheated finely powdered alumina and carbon together with preheated free chlorin through a heated reaction chamber and collecting and condensing the aluminum chlorid vapors produced.

7. In the manufacture of aluminum chlorid the process which comprises heating a mixture of alumina and carbon in suspension in a flowing current of chlorin.

8. In the manufacture of aluminum chlorid, the process which comprises heating a mixture of alumina and carbon in suspension in a preheated flowing current of chlorin.

9. The process of manufacturing aluminum chlorid which comprises preheating a mixture of alumina and carbon in a powdered form and delivering it continuously to a heated reaction chamber by means of a current of chlorin.

10. The process of manufacturing aluminum chlorid which comprises preheating a mixture of alumina and carbon in a powdered form and delivering it continuously to a heated reaction chamber by means of a preheated current of chlorin.

11. In the manufacture of aluminum chlorid the process which comprises delivering a regulated mixture of alumina and carbon to a reaction chamber by means of a regulated current of chlorin and collecting and condensing the aluminum chlorid vapors formed.

In testimony whereof, we affix our signatures hereto.

GEORGE H. KING.
GERALD I. ROBERTS.